United States Patent [19]

Adams

[11] Patent Number: 4,948,985

[45] Date of Patent: Aug. 14, 1990

[54] EXTERNAL PENSTOCK

[76] Inventor: Nelson P. Adams, 1 Center St., Municipal Bldg., Rm. 800, New York, N.Y. 10007

[21] Appl. No.: 278,769

[22] Filed: Dec. 2, 1988

[51] Int. Cl.⁵ .............................................. F03B 13/08
[52] U.S. Cl. ...................................................... 290/54
[58] Field of Search .................. 290/52, 54; 60/398; 415/2.1, 3.1

[56] References Cited

U.S. PATENT DOCUMENTS

| 4,182,123 | 1/1980 | Ueda | 290/54 X |
| 4,324,984 | 4/1982 | Borgren | 290/54 |

FOREIGN PATENT DOCUMENTS

| 59-136579 | 8/1984 | Japan | 290/54 |
| 60-195383 | 10/1985 | Japan | 290/54 |

Primary Examiner—Philip H. Leung
Assistant Examiner—W. E. Duncanson, Jr.
Attorney, Agent, or Firm—Richard L. Miller

[57] ABSTRACT

This external penstock is designed to direct a portion of water from a waterfall to a water wheel coupled to a generator that produces electrical power for industrial and other use. Primarily, it consist of a telescoping sleeve assembly securable to a cliff face behind a water fall, and a nozzle on the bottom of the assembly directs the downward flow of water against blades of a water wheel mounted to a platform also secured to the cliff face behind the waterfall.

3 Claims, 1 Drawing Sheet

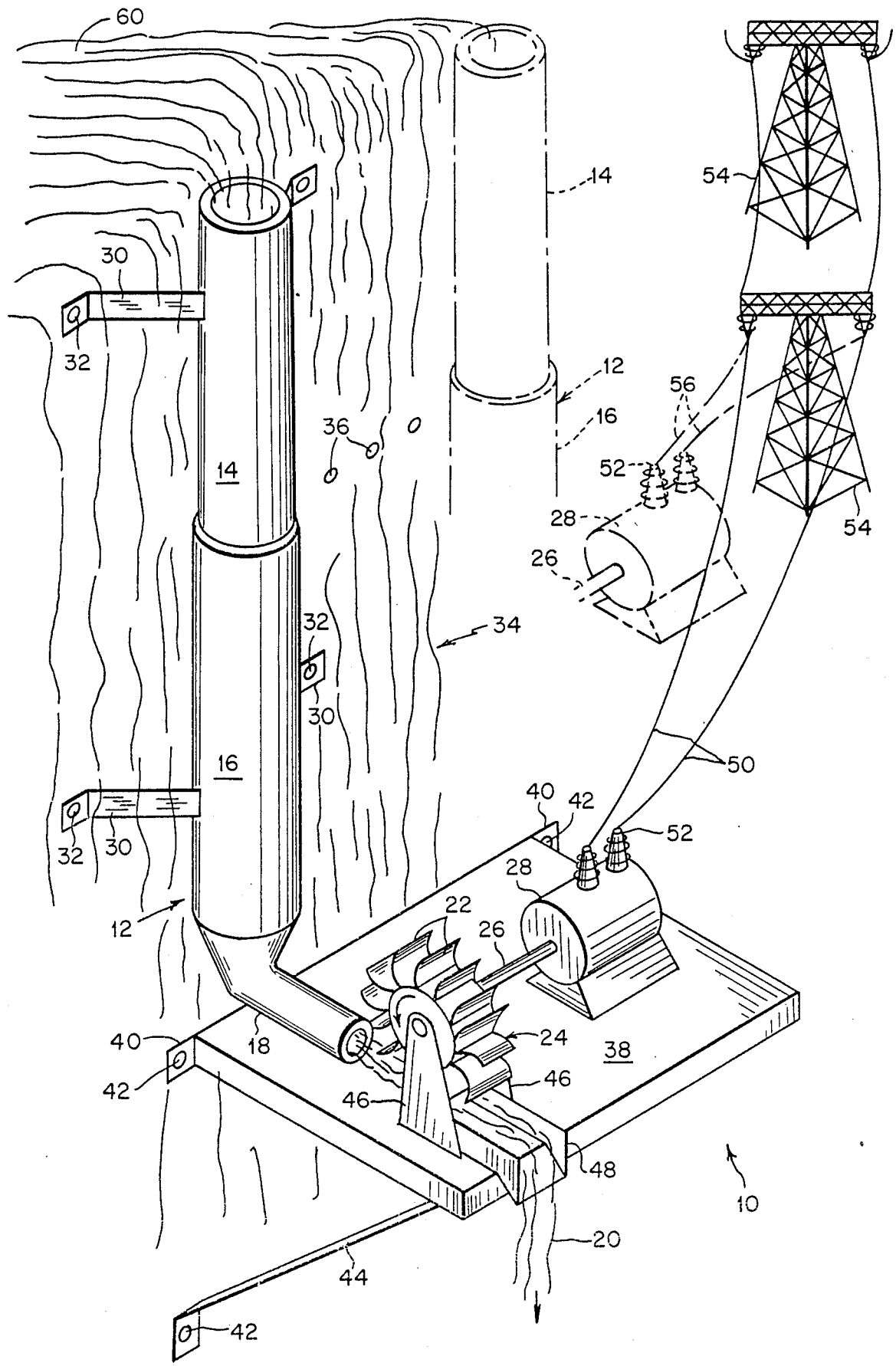

EXTERNAL PENSTOCK

BACKGROUND OF THE INVENTION

The instant invention relates generally to hydro-electric power plants, and more particularly, to an external penstock.

Numerous machines have been provided in the prior art that are adapted to produce useful electrical power. While these units may be suitable for the particular purpose to which they address, they would not be as suitable for the purpose of the present invention as hereafter described.

SUMMARY OF THE INVENTION

A primary object of the present invention is to provide an external penstock that will overcome the shortcomings of the prior art devices.

Another object is to object an external penstock that will be of such design, as to employ the force of a waterfall through a sleeve assembly to produce electrical power.

An additional object is to provide an external penstock that will be of such design, as to be mounted to a face of a cliff surface below a fall to receive the water flow below the water level at the top of the waterfall.

Another object is to provide an external penstock that will be of such design, as to be capable of multiplying the water pressure exiting the penstock nozzle, by the total weight of the water contained within the penstock and sleeve assembly.

Another object is to provide an external penstock that will be of such design, as to be capable of converting the total force of a waterfall, to produce electrical energy.

A further object is to provide an external penstock that is simple and easy to use.

A still further object is to provide an external penstock that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURE

The figures in the drawings are briefly described as follows:

The FIGURE is a diagrammatic perspective and is the sole view illustrating of the instant invention secured below a water fall in use.

DETAILED DESCRIPTION OF THE PREFERRED EMBODIMENTS

Turning now descriptively to the drawings, in which like reference characters denote like elements throughout the several views, an external penstock 10 is shown to include an assembly 12 consisting of an upper inner sleeve 14 that is telescopically received within a lower outer sleeve 16, and a nozzle portion 18 at right angles to sleeve 16, is integrally attached to the bottom of sleeve 16 and directs the flow of water 60 against the blades 22 of water wheel 24 secured to shaft 26 that is also secured to generator 28.

Brackets 30 are fixedly secured by fasteners 32 to the face of the cliff behind the waterfall 34 and are fixedly secured to the outer periphery of the sleeves 14 and 16, for supporting the assembly 12, and sleeves 14 and 16 telescope, so as to adapt to various waterfall elevations, and it shall be noted that a plurality of assemblies 12 may be employed, as illustrated at points 36, to produce even more electrical power.

A platform 38 is provided and is also secured to the face of the cliff behind the waterfall 34 at its rear, by brackets 40 and fasteners 42, and bottom brackets 44 (one of which is shown), are secured also to the face of the cliff behind the waterfall 34 by fasteners 42, so as to support the water wheel 24 and the generator 28. Water wheel 24 is supported within a pair of brackets 46 that are secured to the top of platform 38, in a manner (not shown), and trough 48 is provided for spill-off 20 and is fixedly secured between brackets 46, for water to flow away from platform 38.

Cables 50 are connected to insulated terminals 52 of the generator 28, and are connected to high voltage towers 54 for travel of electricity produced to industrial and other usage areas, and other external penstocks 10 are also coupled to the towers 54 by other lines 56 for additional power output.

In operation, water 60 descending waterfall 34 travels into the top of sleeve 14 and out of the bottom nozzle 18 where it forces against the blades 22 of wheels 24 and rotates wheel 24, thus rotating the coupled electrical generator 28 that produces electrical power that is transmitted by the wire cables 50 via towers 54 to usage sites.

It is to be noted that two variable forces that influence the external penstock efficiency of production would be the pressure of air forcing down at the mouth of the sleeve assembly, and water pressure derived from actual speed of water coming over the falls.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An external penstock for providing electrical power from energy of a waterfall, comprising, a sleeve assembly mountable to a cliff face behind said waterfall, for collecting and directing a column of water descending said waterfall to blades of a water wheel mounted to platform securable to said cliff face behind said waterfall, and a generator secured to said platform, for converting rotary motion of said water wheel to said electrical power, wherein said sleeve assembly includes a first sleeve telescopically received in a second sleeve for adjusting height and said sleeve and said second sleeve are fixedly secured to a pair of sleeve assembly mounting brackets that are securable to said cliff face behind said waterfall by fasteners, and a nozzle is integrally attached to a bottom end of said second sleeve at right angles and said nozzle directs water flow from within, against said blades of said water wheel above said platform, and said platform is securable to said cliff face behind said waterfall by fasteners received in platform brackets and said cliff face.

2. An external penstock as set forth in claim 1, wherein said water wheel is freely and rotatively received and supported between a pair of water wheel mounting brackets fixedly secured to a top surface of said platform, and a shaft secured to said water wheel is secured also to said generator, and cables are secured to output terminals of said generator and transmit electrical current to a usage site.

3. An external penstock as set forth in claim 2, wherein a spill-off water chute is fixedly secured between said water wheel mounting brackets and said top surface of said platform and directs water over a front edge of said platform.

* * * * *